United States Patent
Dennis et al.

(10) Patent No.: US 9,428,952 B2
(45) Date of Patent: Aug. 30, 2016

(54) VACUUM INSULATED GLASS (VIG) WINDOW UNIT WITH REDUCED SEAL HEIGHT VARIATION AND METHOD FOR MAKING SAME

(75) Inventors: Timothy A. Dennis, Bloomdale, OH (US); Andrew W. Pantke, Belleville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1103 days.

(21) Appl. No.: 13/484,597

(22) Filed: May 31, 2012

(65) Prior Publication Data

US 2013/0323441 A1    Dec. 5, 2013

(51) Int. Cl.
- *E06B 3/66* (2006.01)
- *E06B 3/677* (2006.01)
- *E06B 3/663* (2006.01)

(52) U.S. Cl.
CPC ........... *E06B 3/6612* (2013.01); *E06B 3/6775* (2013.01); *E06B 3/663* (2013.01); *Y02B 80/24* (2013.01)

(58) Field of Classification Search
CPC ........ E06B 3/66; E06B 3/6612; E06B 3/663; Y02B 80/24
See application file for complete search history.

(56) References Cited

U.S. PATENT DOCUMENTS

| | | |
|---|---|---|
| 3,837,866 A | 9/1974 | Malmendier et al. |
| 4,256,495 A | 3/1981 | Kawamura et al. |
| 4,299,639 A * | 11/1981 | Bayer ............... B29C 45/14467 156/104 |
| 4,743,302 A | 5/1988 | Dumesnil et al. |
| 5,051,381 A | 9/1991 | Ohji et al. |
| 5,156,894 A | 10/1992 | Hood et al. |
| 5,308,662 A | 5/1994 | Woodard et al. |
| 5,534,469 A | 7/1996 | Hayashi |
| 5,657,607 A | 8/1997 | Collins et al. |
| 5,664,395 A | 9/1997 | Collins et al. |
| 5,784,853 A | 7/1998 | Hood et al. |
| 5,902,652 A | 5/1999 | Collins et al. |
| 6,014,872 A | 1/2000 | Hartig et al. |
| 6,632,491 B1 | 10/2003 | Thomsen et al. |
| 6,692,600 B2 | 2/2004 | Veerasamy et al. |
| 7,425,518 B2 | 9/2008 | Yoshida et al. |
| 7,851,034 B2 | 12/2010 | Cooper |
| 8,101,278 B2 | 1/2012 | Laird |
| 8,137,494 B2 | 3/2012 | Cooper et al. |
| 8,202,587 B2 | 6/2012 | Wang |
| 8,227,055 B2 | 7/2012 | Wang |
| 8,857,698 B2 | 10/2014 | Bouesnard et al. |
| 2005/0233885 A1 | 10/2005 | Yoshida et al. |
| 2007/0148379 A1 | 6/2007 | Theios et al. |
| 2007/0158021 A1 | 7/2007 | Sawai et al. |
| 2010/0330309 A1 | 12/2010 | Cooper |

OTHER PUBLICATIONS

U.S. Appl. No. 13/541,840, filed Jul. 5, 2012; Jones.
U.S. Appl. No. 13/466,356, filed May 8, 2012; Jones.

* cited by examiner

Primary Examiner — Donald J Loney
(74) Attorney, Agent, or Firm — Nixon & Vanderhye P.C.

(57) ABSTRACT

A vacuum insulated glass (VIG) window assembly and method for making same is provided in which a variation in the final edge seal height is preferably 0.20 mm or less, more preferably about 0.15 mm or less. Controlling final edge seal height variations substantially reduces breakage of the glass substrates of the VIG window assembly during vacuum pump-down of the cavity between the glass substrates. Edge seal height variation may be controlled, for example, by controlling initial dispensing of green frit material, controlling temperature variations during firing, and/or controlling cycle times during firing.

9 Claims, 3 Drawing Sheets

VACUUM INSULATED GLASS (VIG) WINDOW UNIT WITH REDUCED SEAL HEIGHT VARIATION AND METHOD FOR MAKING SAME

TECHNICAL FIELD

This disclosure relates generally to vacuum insulated glass (VIG) window unit configurations and methods for making a VIG window unit. The disclosure more particularly relates to configurations of the VIG window unit edge seal and methods for applying an edge seal material to reduce variations in final edge seal height to reduce the likelihood of breakage of the VIG window unit in the vicinity of the edge seal during a pump-down procedure used to evacuate a cavity formed between glass substrates and defined by a perimeter of the edge seal of a VIG window unit. The disclosure also relates to a structural arrangement and dimensional sizing of the unit for reducing an amount of variation (e.g., a tolerance) in edge seal height prior to evacuation of the cavity.

BACKGROUND AND SUMMARY OF EXAMPLE EMBODIMENTS

Vacuum insulating glass (VIG) units typically include at least two spaced apart glass substrates that enclose an evacuated or low-pressure space/cavity therebetween. The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,657,607, 5,664,395, 5,657,607, 5,902,652, 6,506,472 and 6,383,580, the disclosures of which are all hereby incorporated by reference herein in their entireties.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 which may be made of fused solder glass, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed.

VIG units with fused solder glass peripheral edge seals 4 are typically manufactured by depositing glass frit, in a solution (e.g., frit paste), around the periphery of substrate 2 (or on substrate 3). This glass frit paste ultimately forms the glass solder edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then heated to a temperature of at least about 500° C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space 6 may be produced by way of an evacuation process to a level below atmospheric pressure, e.g., below about $10^{-2}$ Torr. To maintain the low pressure in the space/cavity 6, substrates 2, 3 are hermetically sealed. Small high strength spacers/pillars 5 are provided between the substrates to maintain separation of the approximately parallel substrates against atmospheric pressure. As noted above, once the space 6 between substrates 2, 3 is evacuated, the pump-out tube 8 may be sealed, for example, by melting its tip using a laser or the like.

After evacuation of the cavity to a pressure less than atmospheric, sealing of the pump-out tube may be accomplished by heating an end of the pump-out tube that is used to evacuate or purge the cavity to melt the opening and thus seal the cavity of the VIG window unit. For example and without limitation, this heating and melting may be accomplished by laser irradiation of the tip of the pump-out tube.

In some instances breakage of the VIG unit glass in the vicinity of the edge seal during the cavity evacuation process was observed. Significant time and resources were expended in an effort to determine the cause of such breakage during cavity evacuation. It was ultimately recognized that seal height variations may be related to the breakage problems. For example, it may sometimes be the case that the material used to form the edge seal, such as, for example, an adhesive containing frit material, or the like, may include too large of variations in height about the perimeter of the seal that defines the cavity. After conducting numerous experiments, it was surprisingly found that a correlation existed between the seal thickness variation tolerance and instances of breakage during the cavity evacuation (or pump-down) process. It was also surprisingly found that these variations in seal height influence the amount of stress on the VIG units in the vicinity of the seal during the process of evacuating the cavity formed between the glass substrates of the VIG unit. This evacuation process may sometimes be referred to as a pull-down or pump-down procedure. It was also surprisingly found that too large of variations in the seal height sometimes results in sufficient stress during pump-down that the glass of the VIG unit inside the perimeter of and generally in the vicinity of the seal would break. For example, and without limitation, too much variation of the seal height resulted in a gap between the pillars or spacers and at least one of the glass substrates, which allowed the glass substrate to bend or flex during pump-down. The glass was found to break if the variation in seal height about the perimeter of the seal was too great.

It was also found that there may be several causes for resulting large seal height variations. These may include, for example, and without limitation, the degree of uniformity of the initial application of green (e.g., unfired) seal material (e.g., frit), and warping or bending of the glass substrates during the firing process. Both of these conditions were found to contribute to a large degree of variation (e.g., non-uniformity) of final seal height.

To overcome drawbacks associated with glass breakage due to glass bending or flexing during pump-down, it was further determined that reducing variations in seal height about the perimeter of the edge seal resulted in mitigating the stress (e.g., reducing an amount of bend or flex in the glass substrate) on the VIG unit during pump down and reduced the instances of breakage of the VIG unit glass during pump-down. As a result of experimentation, seal height variation or tolerance was able to be reduced to small levels by, for example, and without limitation, controlling the initial dispensed height of the seal material (e.g., frit material), controlling the flow of the seal material during firing and controlling temperature uniformity during the sealing process. For example, and without limitation, it was found that controlling final edge seal height variations to preferably be less than about 0.20 mm, more preferably less than about 0.15 mm and even more preferably less than about 0.10 mm, resulted in significantly reduced glass breakage during pump-down. It may also be advantageous to provide a firing process that reduced warping of the glass substrates during firing and controlled and also controlled flow of the seal material, which may also contribute to reducing edge seal height variation.

In order to achieve lower final edge seal height variations, the inventors found, for example, and without limitation, that controlling the initial dispensed height of the unfired seal material using a machine application process provided significantly improved final seal height uniformity such that the final seal height variations are in acceptable ranges as noted above. In addition, for example, controlling temperature uniformity during firing reduced the amount of warping or bending of the glass substrates, further reducing variations in final seal height. Moreover, controlling the flow of the seal material during firing, for example, also improved the final seal height variations, such as, for example, by performing a longer firing process that allows the seal material to flow to match the height of the pillars/spacers during firing.

These and other advantages are provided by a vacuum insulated glass window unit comprising: a first substrate and a second substrate; a seal material sandwiched between the first and second substrates and defining a periphery of a cavity formed between the first and second substrates, and forming a hermetic seal between the first and second substrates, wherein a variation in a height of the seal material around the low pressure cavity is preferably less than about 0.20 mm, more preferably less than or equal to about 0.15 mm, and even more preferably less than or equal to about 0.10 mm.

Further advantages are provided by a method of making a vacuum insulated glass window unit comprising: depositing a seal material on a first substrate, said seal material having a perimeter, the seal material being deposited by a machine and having an unfired height in a range of about 0.6 mm to 0.9 mm; and firing a subassembly comprising said first substrate, a second substrate and the seal material sandwiched between the first and second substrates to provide a vacuum insulated glass window unit subassembly having a fired seal material height variation of preferably less than about 0.20 mm, more preferably less than or equal to about 0.15 mm, and even more preferably less than or equal to about 0.10 mm.

These and other embodiments and advantages are described herein with respect to certain example embodiments and with reference to the following drawings in which like reference numerals refer to like elements, and wherein:

DETAILED DESCRIPTION OF EXAMPLE EMBODIMENTS

Figure 2:
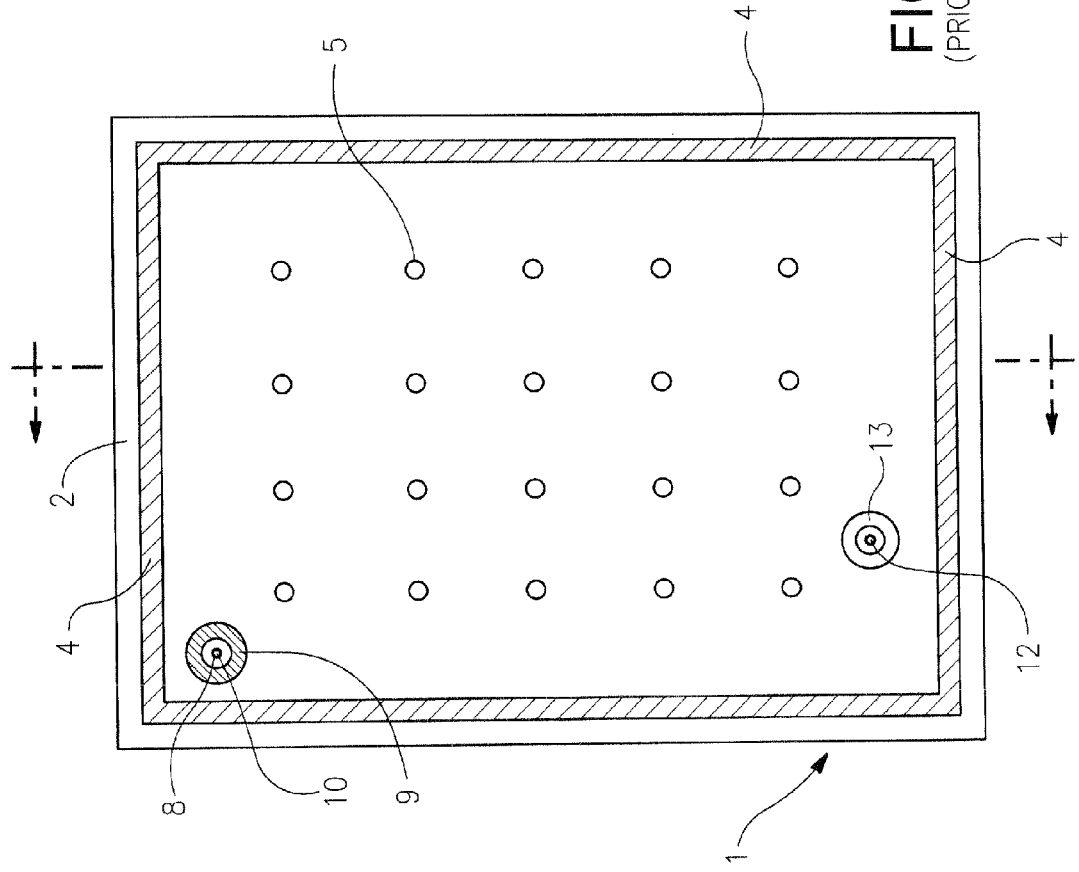
FIG. 2 is a top plan view of a conventional VIG unit.
Figure 1:
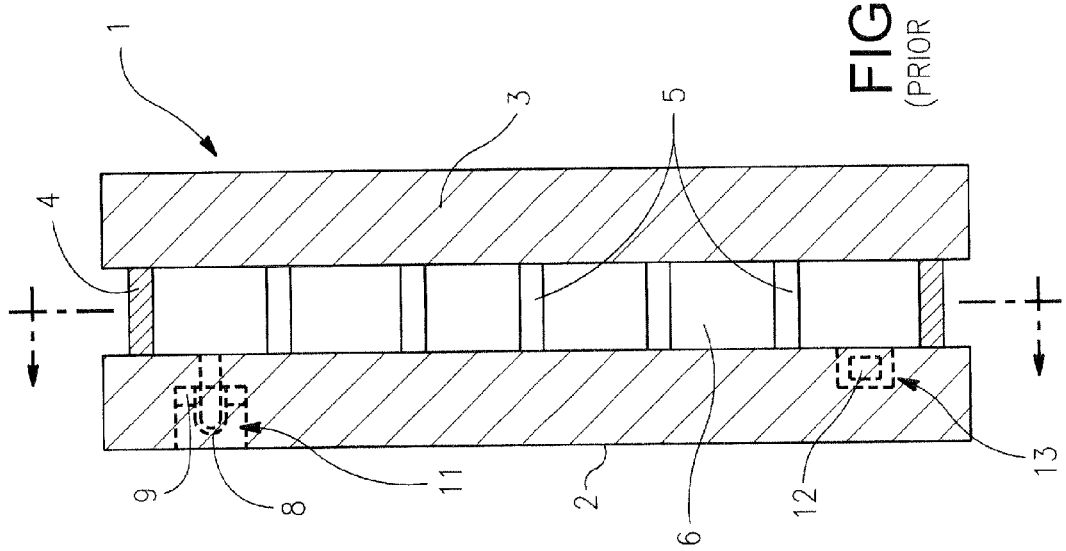
FIG. 1 is a cross sectional schematic diagram of a conventional VIG unit.

Certain example embodiments will be described in detail herein with reference to the foregoing drawings in which like reference numerals refer to like elements. It will be understood that the embodiments described herein are intended to be illustrative, not limiting, and that those skilled in the art will understand that various modifications may be made without departing from the true spirit and full scope of the claims appended hereto.

Figure 3:
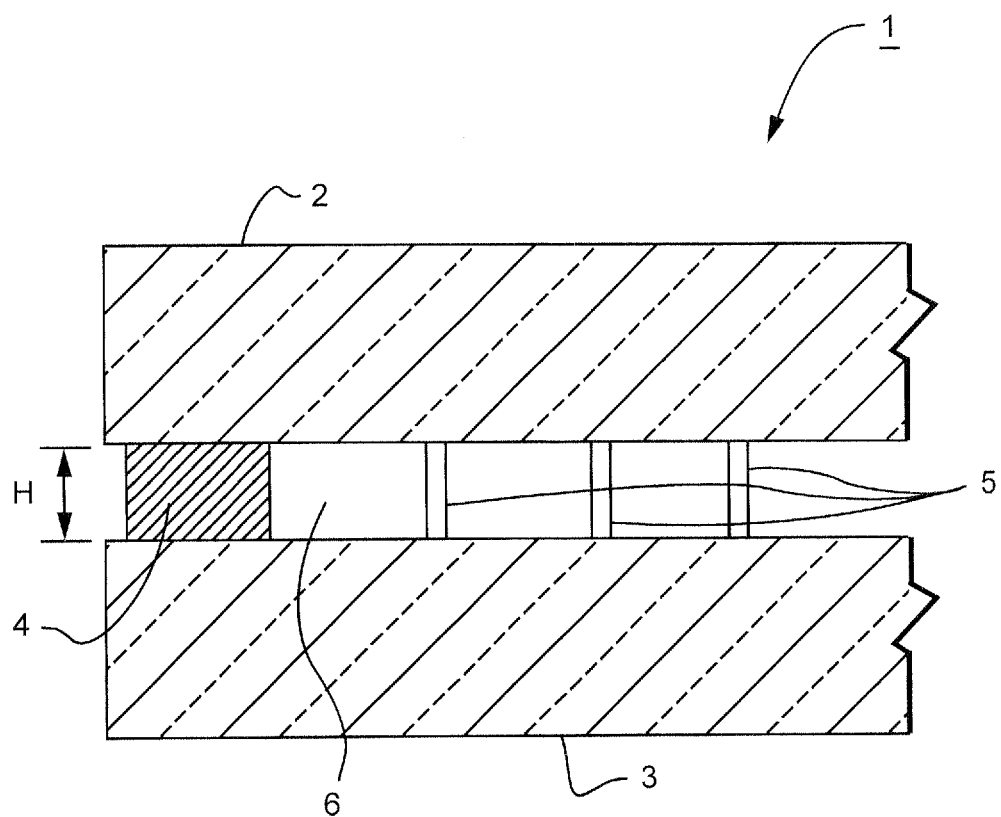
FIG. 3 is a schematic partial cross sectional diagram illustrating an edge portion of an example VIG unit according to an example embodiment.

With reference to FIG. 3, a schematic cross sectional view of a portion of an example VIG window unit 1 is illustrated. The VIG window unit 1 includes spaced apart first and second transparent glass substrates 2, 3 that may be interconnected by an edge seal 4, which may, for example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354,963, and may be used for the edge seal 4 in certain example embodiments. Conventional solder glass fit material may also be used for the edge seal 4 in certain example embodiments. When using VBZ type seal compositions, a lower temperature sealing thermal profile is used to maintain the desired temper of the glass of the VIG unit because VBZ compositions have a lower firing temperature (e.g., <250° C.) than certain other conventional glass frit compositions (e.g., about 500° C.) that may be used to form seals in VIG units. It will be understood that the embodiments disclosed herein are equally applicable to VIG configurations using any suitable seal material. As noted above, the perimeter of the edge seal 4 defines a hermetically sealed cavity 6 between the substrates that is evacuated as described above.

In certain embodiments, the transparent glass substrates 2, 3 may be approximately the same size. However, in certain other example embodiments, one glass substrate may be larger than the other to provide, for example, an approximately L-shaped step proximate an edge of the VIG unit. One or both of the glass substrates 2, 3 may also optionally include at least one coating material (not shown), such as, for example, and without limitation, a low-E coating. It will be understood that various coatings may be present on an interior surface of at least one of the glass substrates 2, 3, and that such coatings provide various beneficial performance characteristics to the VIG window unit 1. In certain example embodiments, the VIG window unit has a visible transmission of at least about 30%, more preferably of at least about 40%, even more preferably of at least about 50%, and even more preferably of at least about 60% or 70%.

An array of support pillars/spacers 5 may also be included between the glass substrates 2, 3 to maintain the spacing of the substrates in view of the lower than atmospheric pressure that is ultimately provided in cavity 6 between the substrates 2, 3. In certain example embodiments, the spacers may have a height, for example, of about 0.1 to 1.0 mm, more preferably from about 0.2 to 0.4 mm. The height of the spacers may define the height of the vacuum cavity 6. As noted above, the spacers 5 are preferably of a size that is sufficiently small so as to be visibly unobtrusive. According to certain example embodiments, the spacers may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube (not shown in FIG. 3) is used in a process to evacuate the cavity 6 between the substrates 2, 3, such as, for example, by attaching a vacuum pump to the pump-out tube and evacuating the cavity to a low pressure, e.g., a pressure lower than atmospheric pressure. In a preferred example, a pressure in the cavity 6 is, for example, preferably below about $10^{-2}$ Torr, and more preferably below about $10^{-3}$ Torr, and even more preferably below about $5 \times 10^{-4}$ Torr. After evacuating the cavity 6, the pump-out tube may be sealed, for example, by melting the tip of the tube by any suitable means, such as, for example, by laser. VIG window units may be used, for example, and without limitation, as windows in residential homes, office buildings, apartment buildings, doors, and/or the like.

According to certain example embodiments, variations in seal height are controlled to mitigate the stress (e.g., reducing an amount of bend in the glass substrate) on the VIG unit during pump down and thus reduce instances of breakage of the VIG unit glass during pump-down. As a result of extensive experimentation, seal height variation or tolerance was able to be reduced by, for example, and without limitation, by controlling the initial dispensed height of the seal material (e.g., frit material), controlling the flow of the seal material during firing and/or controlling temperature uniformity during the sealing process. For example, and without limitation, it was found that controlling final edge seal height variations to preferably be less than about 0.20 mm, more preferably less than about 0.15 mm and even more preferably less than about 0.10 mm, resulted in significantly reduced breakage during pump-down. "Variation" can be considered to be a difference between a maximum seal height and a minimum seal height. Thus, around the entire periphery of the edge seal surrounding the low pressure cavity, the maximum height of the edge seal varies from the minimum height of the edge seal by less than 0.20 mm, more preferably less than about 0.15 mm and even more preferably less than about 0.10 mm. According to certain example embodiments, for example, and without limitation, seal height variations may be reduced by providing a machine application process that more closely controls the initial dispensed height of the seal material (e.g., frit). In addition, to reduce warping or bending of the glass substrates of the VIG window unit that may contribute to final edge seal height variations, a more controlled firing process, such as, for example, having less temperature variations and/or a longer firing time may be used. In addition, according to further example embodiments, a longer firing process may be used to control the flow of the seal material during firing, such as, for example, by allowing the seal material to flow to more closely match the height of the pillars or spacers during firing, providing further reduction in seal height variation.

According to certain example embodiments, a method of making a VIG window unit is disclosed. According to certain example methods, initial seal height material application may be controlled using a machine for dispensing of the initial seal material on one of the glass substrates of the VIG unit. The initial dispensed seal material height may depend upon the type of process used for subsequent firing. For example, and without limitation, initial seal material deposition for short-wave infrared (SWIR) firing may preferably have a green unfired (e.g., measured dry) frit (e.g., seal material) height in a range of about 0.4 mm to 0.9 mm, or more preferably in a range of about 0.5 mm to 0.8 mm, and even more preferably about 0.6 mm to 0.7 mm. Because of the relatively short time used for SWIR processing, the tolerance of initial green frit height deposition is lower than in the case of a longer cycle firing process. For example, and without limitation, for longer cycle convention type firing, for example, green unfired frit heights may preferably be in a range of about 0.4 mm to 1.0 mm, or more preferably about 0.5 mm to 0.9 mm, and even more preferably about 0.6 mm to 0.9 mm, due to longer peak heating times that allows the seal material to flow or settle down to the height of the pillars or spacers. According to still further embodiments, the thermal cycle may be controlled to provide additional control or reduction in seal height variation by, for example, reducing the amount of warping or twisting of the glass substrates of the VIG unit. For example, differentials in temperature may cause the glass substrates to warp and twist, resulting in further disadvantageous seal height variation. Therefore, according to certain example embodiments, firing conditions may be controlled to provide, for example, greater temperature uniformity (e.g., <2.0° C.) and sufficient heating time (e.g., 20-30 minutes) to allow the glass to stabilize and flatten by allowing the glass substrates to reach even temperature and flatten.

Referring back to FIG. 3, the final seal height H of the edge seal 4 is shown. According to certain example embodiments, variations in the height H of the edge seal 4 along the perimeter of the edge seal 4 of the VIG unit 1 may be controlled, for example, and without limitation, by controlling variations in the initial dispensed height of the seal material (e.g., frit). As noted above, preferred example initial dispensed frit height may depend, for example, on the type of process used to fire the VIG unit. According to certain example embodiments using a SWIR type firing process, the initial dispensed seal material height may preferably be, for example, in a range of about 0.4 mm to 0.9 mm, or more preferably in a range of about 0.5 mm to 0.8 mm, and even more preferably about 0.6 mm to 0.7 mm. According to other example embodiments using, for example, a longer cycle convention type firing, the initial dispensed seal material height (e.g., green unfired frit height) may preferably be in a range of about 0.4 mm to 1.0 mm, or more preferably about 0.5 mm to 0.9 mm, and even more preferably about 0.6 mm to 0.9 mm. The variations in the longer cycle convention type processes may be larger because this type of firing process may typically have longer peak heating times. According to example embodiments, the initial frit dispensing may be performed using a machine process due to the close tolerances set forth with respect to the above example embodiments. Moreover, according to certain example embodiments, it may be preferable to have longer peak heating times to facilitate flow of the seal material during firing and facilitate flattening of the glass substrates to further assist in reducing variations in final seal height. In addition, as noted above, differentials in temperature may cause the glass substrates to warp and twist, resulting in further disadvantageous seal height variation. Therefore, according to certain example embodiments, firing conditions may be controlled to provide, for example, greater temperature uniformity (e.g., in a range of about <2.0° C.) and sufficient heating time (e.g., in a range of about 20-30 minutes) to allow the glass to stabilize and flatten by allowing the glass substrates to reach even temperature and to allow the seal material to flow. The resulting VIG unit preferably has a reduced final seal height variation, such as, for example, wherein the final edge seal height variation is preferably less than about 0.20 mm, more preferably less than or equal to 0.15 mm, and even more preferably less than or equal to about 0.10 mm.

Figure 4:
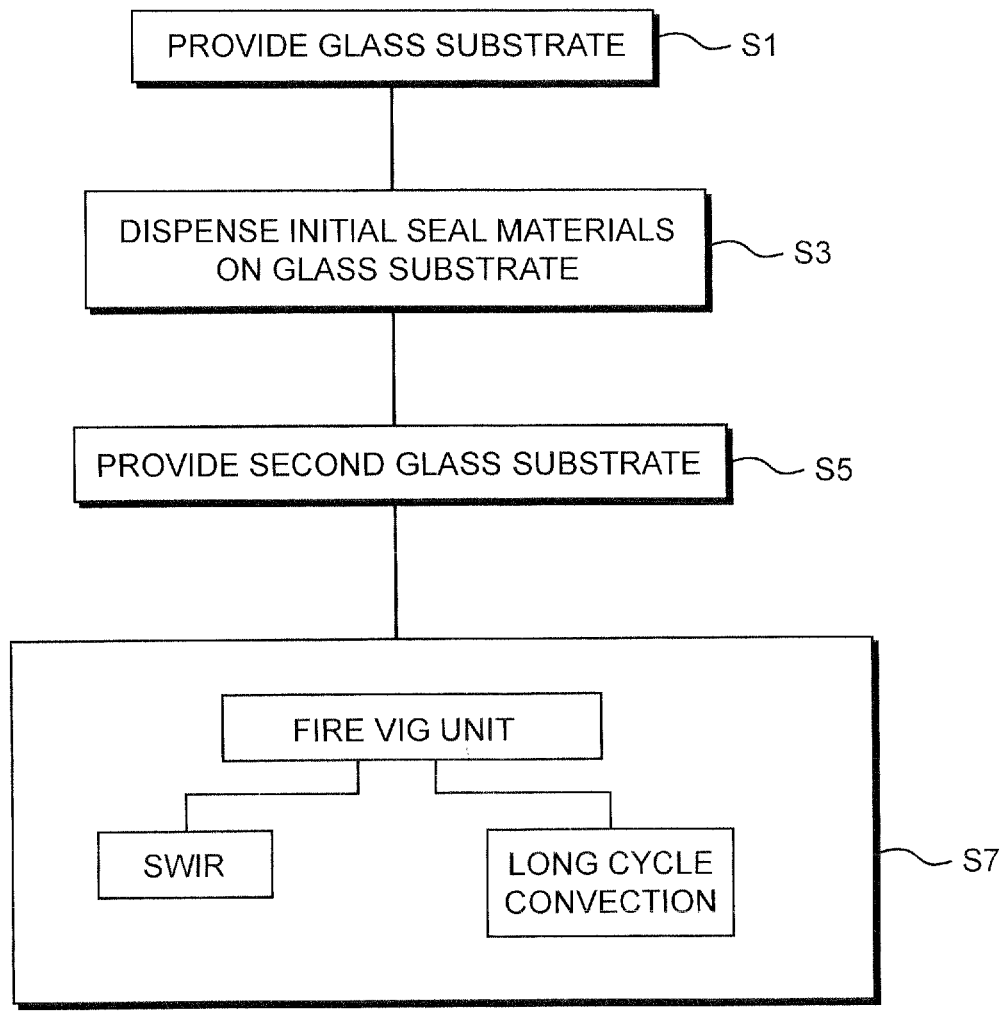
FIG. 4 is a flow chart illustrating a method of making a VIG unit according to certain example embodiments wherein various process conditions including, for example, seal material height are controlled.

FIG. 4 is an illustrative example flowchart illustrating a method of making a VIG window unit according to certain example embodiments. As shown in FIG. 4, a first glass substrate is provided S1. The glass substrate may be processed to provide certain structural features of a typical VIG window unit, such as, for example, spacers or pillars, or the like. The first glass substrate may then be provided with a seal material disposed, for example, and without limitation, about a perimeter of an area to be sealed and which defines a cavity with a second glass substrate (discussed below) S3. As noted above, there may be any number of possible frit or seal materials used to form the seal in the VIG window unit. For example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354,963, and may be used for the edge seal 4 in certain example embodiments. Conventional solder glass frit material may also be used for the edge seal 4 in certain example embodiments. According to certain preferred example embodiments, the seal material is deposited by machine to a green frit height S3 based, for example, on a type of subsequent firing to be used. For example, in short-wave infrared (SWIR) firing a green unfired frit (e.g., seal material) height may preferably be in a range of about 0.4 mm to 0.9 mm, or more preferably in a range of about 0.5 mm to 0.8 mm, and even more preferably about 0.6 mm to 0.7 mm. As noted above, because of the relatively short time used for SWIR processing, the tolerance of initial green frit height deposition may be lower than in the case of a longer cycle firing process. For example, and without limitation, for longer cycle convention type firing as discussed in greater detail above, for example, green unfired frit heights may preferably be in a range of about 0.4 mm to 1.0 mm, or more preferably about 0.5 mm to 0.9 mm, and even more preferably about 0.6 mm to 0.9 mm, due to longer peak heating times that allows the seal material to flow or settle down to the height of the pillars or spacers. After the seal material is provided S3, a second glass substrate is provided S5 which sandwiches the pillars and unfired frit material between the first and second glass substrates. The first and second glass substrates, together with the frit seal material are then fired S7 using any suitable technique, such as, for example, and without limitation, SWIR or long cycle convection. The resulting VIG unit preferably has a reduced final seal height variation, such as, for example, the final edge seal height variation is preferably less than about 0.20 mm, more preferably less than or equal to about 0.15 mm, and even more preferably less than or equal to about 0.10 mm.

Thus, in certain example embodiments of this invention, there is provided a vacuum insulated glass (VIG) window unit comprising: a first substrate and a second substrate; a seal material sandwiched between the first and second substrates defining a periphery of a cavity formed between the first and second substrates, the cavity between the substrates being at a pressure less than atmospheric, and the seal material forming a hermetic seal between the first and second substrates, wherein a variation in a height of the seal material around the entire cavity is less than about 0.20 mm.

In the VIG window unit of the immediately preceding paragraph, the variation in the height of the seal material around the entire cavity may be less than or equal to about 0.15 mm, more preferably less than or equal about 0.10 mm.

In the VIG window unit of any of the preceding two paragraphs, there may also be provided a plurality of spacers disposed between said first and second substrates.

In the VIG window unit of any of the preceding three paragraphs, a height of the seal material may substantially match a height of spacers between the substrates.

In the VIG window unit of any of the preceding four paragraphs, said first and second substrates may be glass substrates.

In the VIG window unit of any of the preceding five paragraphs, said seal material may comprise an adhesive containing frit.

In the VIG window unit of any of the preceding six paragraphs, said seal material may comprise vanadium.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A vacuum insulated glass (VIG) window unit comprising:
   a first glass substrate and a second glass substrate;
   a seal material consisting essentially of frit sandwiched between the first and second glass substrates defining a periphery of a cavity formed between the first and second substrates, the cavity between the substrates being at a pressure less than atmospheric,
   a plurality of spacers provided between the first and second glass substrates for spacing the first and second glass substrates from each other; and
   the seal material consisting essentially of frit forming a hermetic seal between the first and second glass substrates of the VIG window unit, wherein a variation in a height of the seal material around the entire cavity is less than or equal to 0.15 mm.

2. The vacuum insulated glass window unit of claim 1, wherein the variation in the height of the seal material around the entire cavity is less than or equal to 0.10 mm.

3. The vacuum insulated glass window unit of claim 1, wherein a height of the seal material substantially matches a height of said spacers.

4. The vacuum insulated glass window unit of claim 1, wherein said seal material comprises an adhesive containing frit.

5. The vacuum insulated glass window unit of claim 1, wherein said seal material comprises vanadium.

6. The vacuum insulated glass window unit of claim 1, wherein the seal material has an initial height of from 0.4 to 1.0 mm.

7. The vacuum insulated glass window unit of claim 1, wherein the spacers have height from 0.2 to 0.4 mm.

8. The vacuum insulated glass window unit of claim 1, wherein the frit comprises vanadium, zinc and barium.

9. The vacuum insulated glass window unit of claim 1, wherein the frit comprises solder glass frit.

\* \* \* \* \*